(12) United States Patent
Chang

(10) Patent No.: US 9,120,289 B2
(45) Date of Patent: Sep. 1, 2015

(54) SEALING FILM WITH HIDDEN TAB

(71) Applicant: TAIWAN FOREVER INDUSTRY CO., LTD., TAIPEI (TW)

(72) Inventor: Hsien-Liang Chang, Taipei (TW)

(73) Assignee: TAIWAN FOREVER INDUSTRY CO., LTD. (TW)

( * ) Notice: Subject to any disclaimer, the term of this patent is extended or adjusted under 35 U.S.C. 154(b) by 221 days.

(21) Appl. No.: 13/727,907

(22) Filed: Dec. 27, 2012

(65) Prior Publication Data

US 2014/0186589 A1    Jul. 3, 2014

(51) Int. Cl.

| | |
|---|---|
| *B32B 3/00* | (2006.01) |
| *B32B 27/28* | (2006.01) |
| *B32B 27/36* | (2006.01) |
| *B32B 27/08* | (2006.01) |
| *B32B 27/34* | (2006.01) |
| *B32B 15/04* | (2006.01) |
| *B32B 7/12* | (2006.01) |
| *B32B 15/095* | (2006.01) |

(52) U.S. Cl.
CPC .................. *B32B 7/12* (2013.01); *B32B 15/095* (2013.01); *B32B 27/08* (2013.01); *Y10T 428/24752* (2015.01); *Y10T 428/2804* (2015.01)

(58) Field of Classification Search
CPC .............. B32B 7/06; B32B 7/12; B32B 7/14; B32B 27/34; B32B 27/36; B32B 27/08; B32B 27/32; B32B 27/00; B32B 15/08; B32B 15/085; B32B 15/088; B32B 15/09; B65D 17/16; B65D 17/163; B65D 17/165; B65D 17/502; B65D 17/2024; B65D 2517/0014; B65D 2517/0016; B65D 2517/5083; B65D 2517/0013; B65D 2543/00092; B65D 2543/00296; B65D 2577/205; B65D 53/08; B65D 55/066; B65D 2577/2041; B65D 2577/2058; B65D 77/2032; B65D 77/204; B65D 77/2024; B65D 77/2028
USPC ................ 428/189, 192, 474.4, 475.2, 475.5, 428/475.8, 457; 220/269, 270, 272, 273, 220/359.2, 359.3, 359.4; 215/305, 258, 232
See application file for complete search history.

(56) References Cited

U.S. PATENT DOCUMENTS

2014/0061197 A1*  3/2014  Thorstensen-Woll ..... 220/359.2

* cited by examiner

*Primary Examiner* — Catherine A Simone
(74) *Attorney, Agent, or Firm* — Schmeiser, Olsen & Watts, LLP

(57) ABSTRACT

A sealing film with a hidden tab includes a bottom layer and a top layer. The bottom layer includes a heat sealing layer, an aluminum foil layer, and a polypropylene layer. The top layer includes a nylon layer and a polyethylene terephthalate layer, and is defined with a connection portion and a tab portion. The nylon layer in the connection portion is adhered to the polypropylene layer by an adhesive. At least a contact is disposed between the nylon layer in the tab portion and the polypropylene layer. Due to physical properties of the material of which the nylon layer in the tab portion is made, the sealing film is likely to sever but easy to peel off. The contact not only prevents the tab portion of the top layer from warping but also enables a user to determine whether the sealing film has ever been used before.

4 Claims, 4 Drawing Sheets

SEALING FILM WITH HIDDEN TAB

FIELD OF TECHNOLOGY

The present invention relates to sealing films for sealing the mouths of containers, and more particularly, to a sealing film with a hidden tab.

BACKGROUND

According to the prior art, a sealing film usually has a tab extending therefrom such that a user can grip the tab in order to tear off the sealing film. However, the outwardly extending tab is typically too tiny for an average user to grip firmly.

Furthermore, according to the prior art, the junction of the sealing film and the tab extending therefrom is seldom structurally durable and thus is likely to sever under a pull applied by a user.

During a process whereby the mouth of a container is being sealed with the sealing film, the tab has to be folded. However, the tab thus folded is not flush with the sealing film. As a result, the tab-disposed portion of the sealing film cannot seal the mouth of the contain tightly, thereby resulting in the likelihood that the contents of the container may leak out of the container.

To overcome the aforesaid drawbacks of the prior art, a hidden tab structure was put forth. However, the hidden tab structure has its own drawbacks too. For example, the hidden tab structure is made of a foam material which is too adhesive to operate. Furthermore, the hidden tab structure is made of various materials of different coefficients of thermal expansion, and the difference between the coefficients of thermal expansion account for warps that arise from heat treatment.

SUMMARY

In view of the aforesaid drawbacks of the prior art, it is an objective of the present invention to provide a sealing film which is easy to use and unlike to warp.

In order to achieve the above and other objectives, the present invention provides a sealing film with a hidden tab, comprising: a bottom layer comprising a heat sealing layer, an aluminum foil layer, and a polypropylene layer (PP layer) arranged from bottom to top and bound by an adhesive; and a top layer attached to the bottom layer and comprising a nylon layer and a polyethylene terephthalate layer (PET layer) from bottom to top, the nylon layer being adhered to the PET layer by an adhesive, the top layer being defined with a connection portion and a tab portion, wherein the nylon layer in the connection portion of the top layer is adhered to the PP layer of the bottom layer by an adhesive, and at least a contact is disposed between the nylon layer in the tab portion of the top layer and the PP layer of the bottom layer.

As regards the sealing film in an embodiment of the present invention, an adhesion-related area of the connection portion accounts for a half of an area of the bottom layer.

As regards the sealing film in an embodiment of the present invention, if the contact is in the number of one, the contact will be positioned on a line of symmetry of the tab portion.

As regards the sealing film in an embodiment of the present invention, the adhesive is made of polyurethane (PU).

In conclusion, unlike the prior art which discloses a tab structure made of a foam material, the present invention discloses a sealing film with a hidden tab characterized in that a nylon layer in a tab portion of the sealing film is tough and resilient such that the tab portion is not susceptible to rupture. Furthermore, the polypropylene (PP) material and the foam material, from which the conventional tab structure is made, are likely to be adhered to each other. By contrast, the present invention is characterized in that the nylon layer of the top layer is unlikely to be adhered to the PP layer of the bottom layer such that it is easy to peel the tab portion of the top layer from the bottom layer. Furthermore, the present invention is further characterized by a contact disposed between the nylon layer in the tab portion of the top layer and the PP layer of the bottom layer. The contact has two purposes. First, the contact prevents the sealing film from warping which might otherwise occur because of a difference in the coefficient of thermal expansion between different constituent layers of the sealing film when heated up, for example, in a high-temperature sterilization process. Second, if a user watches the contact and discovers that the contact has cracked or even ruptured, the user can determine instantly and undoubtedly that the sealing film has ever been used before, thereby allowing the user to avoid using a second-hand product unwittingly and enhance the user's safety.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION

Figure 1A:
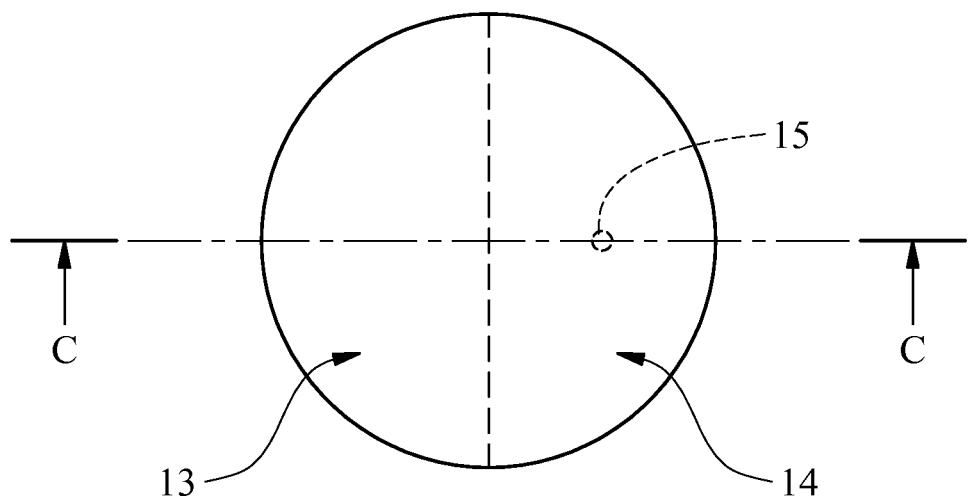
FIG. 1A is a top view of a sealing film with a hidden tab according to an embodiment of the present invention.
Figure 1B:
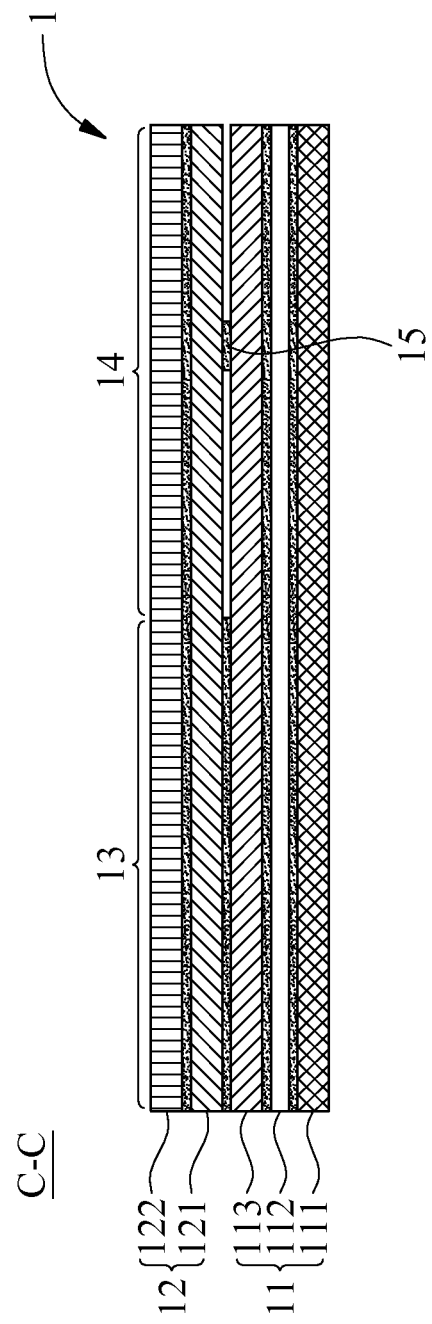
FIG. 1B is a cross-sectional view of the sealing film with a hidden tab taken along line C-C of FIG. 1A.

Referring to FIG. 1A and FIG. 1B, according to the present invention, a sealing film 1 with a hidden tab comprises a bottom layer 11 and a top layer 12. The bottom layer 11 adheres to the mouth of a container to seal the container hermetically. A portion of the top layer 12 functions as a tab that can be gripped and pulled by a user to tear off the sealing film 1. In this embodiment, the bottom layer 11 and the top layer 12 are equal in area, and thus the tab of the sealing film 1 is hidden.

Furthermore, in this embodiment, to match the round mouth of the container, the sealing film 1 is of a round shape. However, persons skilled in the art understand that the shape of the sealing film 1 of the present invention is subject to changes in accordance with the mouth of the intended container.

The bottom layer 11 comprises a heat sealing layer 111, an aluminum foil layer 112, and a polypropylene layer (PP layer) 113. The heat sealing layer 111 is made of a heat-sealing plastic. The heat sealing layer 111 is adhered to the mouth of the container so as to seal the container hermetically. The heat-sealing plastic is a commercially available thermally molten plastic. The type of the heat-sealing plastic of the present invention depends on the material of which the container is made with a view to providing a sufficiently strong adhesive force. Furthermore, the physical properties, composition, and use of the heat-sealing plastic are known among persons skilled in art and thus are not described in detail herein for the sake of brevity. The aluminum foil layer 112 is adhered to the heat sealing layer 111. The aluminum foil layer 112 and the heat sealing layer 111 are adhered to each other with an adhesive. The aluminum foil layer 112 is made of a waterproof material, such as metallic aluminum. The PP layer 113 is adhered to the aluminum foil layer 112. The PP layer 113 and the aluminum foil layer 112 are adhered to each other with an adhesive. The PP layer 113 comprises polymeric polypropylene (PP).

The top layer 12 comprises a transparent nylon layer 121 and a transparent polyethylene terephthalate layer (PET layer) 122 adhered to the nylon layer 121. The top layer 12 is defined with a connection portion 13 and a tab portion 14. The nylon layer 121 is made of a transparent supporting material, such as a rigid nylon polymer. It is difficult for the nylon layer 121 of the top layer 12 to be adhered to the PP layer 113 of the bottom layer 11, and thus the tab portion 14 of the top layer 12 is likely to separate from the bottom layer 11. Furthermore, the nylon layer 121 and the PET layer 122 of the top layer 12 are adhered to each other with an adhesive. The nylon layer 121 in the connection portion 13 of the top layer 12 is adhered to the PP layer 113 of the bottom layer 11 with an adhesive, such that the nylon layer 121 in the connection portion 13 of the top layer 12 is fixedly connected to the PP layer 113 of the bottom layer 11. Furthermore, the adhesion-related area of the connection portion 13 of the top layer 12 accounts for a half of the area of the bottom layer 11, though the present invention is not limited thereto, as the ratio of the adhesion-related area of the connection portion 13 to the area of the bottom layer 11 is subject to changes as needed. In this embodiment, a contact 15 is disposed between the nylon layer 121 in the tab portion 14 of the top layer 12 and the PP layer 113 of the bottom layer 11. The contact 15 enables an adhesive to removably fix the nylon layer 121 in the tab portion 14 of the top layer 12 to the PP layer 113 of the bottom layer 11 such that, according to the present invention, a heating process (such as a high-temperature sterilization process) performed on the sealing film 1 with a hidden tab does not cause a warp to the sealing film 1 because of a difference in thermal expansion between the aforesaid constituent elements of the sealing film 1, and thus does not cause the separation of the top layer 12 and the bottom layer 11. Hence, in this embodiment, the sealing film 1 with a hidden tab features enhanced ease of use. Since the top layer 12 is transparent, as soon as the user watches the contact 15 through the top layer 12 and discovers that the contact 15 has already cracked or even ruptured, the user is instantly and undoubtedly alerted to the fact that the sealing film 1 has ever been used before, thereby enabling the user to avoid using a second-hand product unwittingly and enhancing the user's safety. In this embodiment, the contact 15 is positioned on the line of symmetry of the tab portion 14 and thereby is evenly fixed to the tab portion 14, though the present invention is not limited thereto; instead, the contact 15 can be positioned in the other areas, depending on the shape of the tab portion 14. The adhesion between the connection portion 13 of the top layer 12 and the PP layer 113 of the bottom layer 11 is stronger than the adhesion of the contact 15 to the connection portion 13 of the top layer 12 and the PP layer 113 of the bottom layer 11. Hence, even though the contact 15 has already cracked or even ruptured, the connection portion 13 of the top layer 12 and the PP layer 113 of the bottom layer 11 remain connected to each other.

Figure 2:
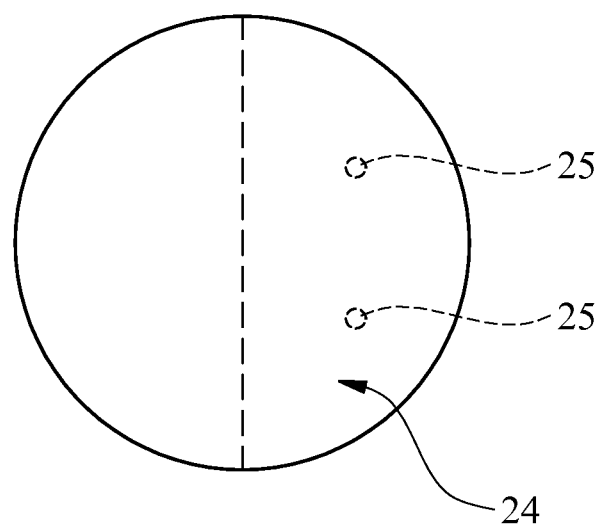
FIG. 2 is a top view of the sealing film with a hidden tab according to another embodiment of the present invention.

Furthermore, in another embodiment of the present invention, more than one contact is disposed between the nylon layer in the tab portion of the top layer and the PP layer of the bottom layer. Referring to FIG. 2, a sealing film 2 is provided with two contacts 25 whereby a large portion of a tab portion 24 is prevented from warping.

Referring to FIG. 1A and FIG. 1B, in this embodiment, an adhesive applied to and disposed between the heat sealing layer 111, the aluminum foil layer 112, the PP layer 113, the nylon layer 121, and the PET layer 122 is made of polyurethane (PU). Persons skilled in the art understand that, considering the respective physical properties of the aforesaid layers, the polyurethane (PU) adhesive applied thereto has to manifest physical properties or composition for providing sufficiently strong adhesion. Also, in the course of a dispensing process performed on the bottom layer 11, a plurality of adhesive tape dispensing contact areas is defined between the heat sealing layer 111 and the aluminum foil layer 112, and between the aluminum foil layer 112 and the PP layer 113 by means of dispensing. Furthermore, in the course of a dispensing process performed on the top layer 12, an adhesive tape dispensing contact area is defined between the nylon layer 121 and the PET layer 122 by means of dispensing. Preferably, the adhesive tapes between the aforesaid contact areas are spaced apart from each other by a constant distance to therefore facilitate uniform distribution of adhesive. Furthermore, the contact area between the PP layer 113 and the nylon layer 121 are divided into two sub-areas where a dispensing process is performed separately, so as to form not only the connection portion 13 intended for fixation and connection but also the contact 15 susceptible to cracking and rupture. The dispensing process is followed by a lamination process whereby the adhesive thus dispensed can be evenly distributed across the contact areas, but the present invention is not limited to the aforesaid dispensing process but includes a conventional process.

Figure 3:
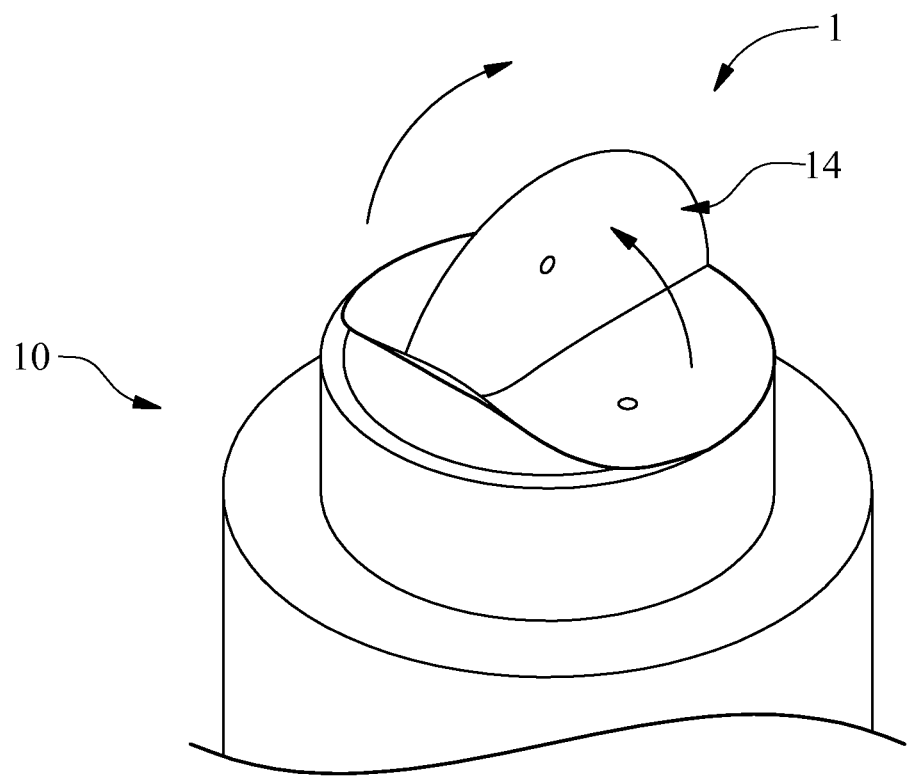
FIG. 3 is a schematic perspective view of operation of the sealing film with a hidden tab.

Referring to FIG. 3, there is shown a diagram of the operation of the sealing film 1 with a hidden tab according to the present invention. To tear the sealing film 1 off a container 10, the user grips and lifts the tab portion 14 of the top layer 12 to separate the sealing film 1 from the mouth of the container 10.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A sealing film with a hidden tab, comprising:
    a bottom layer comprising a heat sealing layer, an aluminum foil layer, and a polypropylene layer (PP layer) arranged from bottom to top and bound by an adhesive; and
    a top layer attached to the bottom layer and comprising a nylon layer and a polyethylene terephthalate layer (PET layer) from bottom to top, the nylon layer being adhered to the PET layer by an adhesive, the top layer being defined with a connection portion and a tab portion,
    wherein the nylon layer in the connection portion of the top layer is adhered to the PP layer of the bottom layer by an adhesive, and at least a contact is disposed between the nylon layer in the tab portion of the top layer and the PP layer of the bottom layer;
    wherein the contact enables an adhesive to removably fix the nylon layer in the tab portion of the top layer to the PP layer of the bottom layer.

2. The sealing film of claim 1, wherein an adhesion-related area of the connection portion accounts for a half of an area of the bottom layer.

3. The sealing film of claim 1, wherein the contact is positioned on a line of symmetry of the tab portion.

4. The sealing film of claim 1, wherein the adhesive is made of polyurethane (PU).

\* \* \* \* \*